No. 692,145. Patented Jan. 28, 1902.
W. J. KERR.
GRAIN SEPARATOR.
(Application filed Oct. 6, 1900.)
(No Model.) 2 Sheets—Sheet 1.
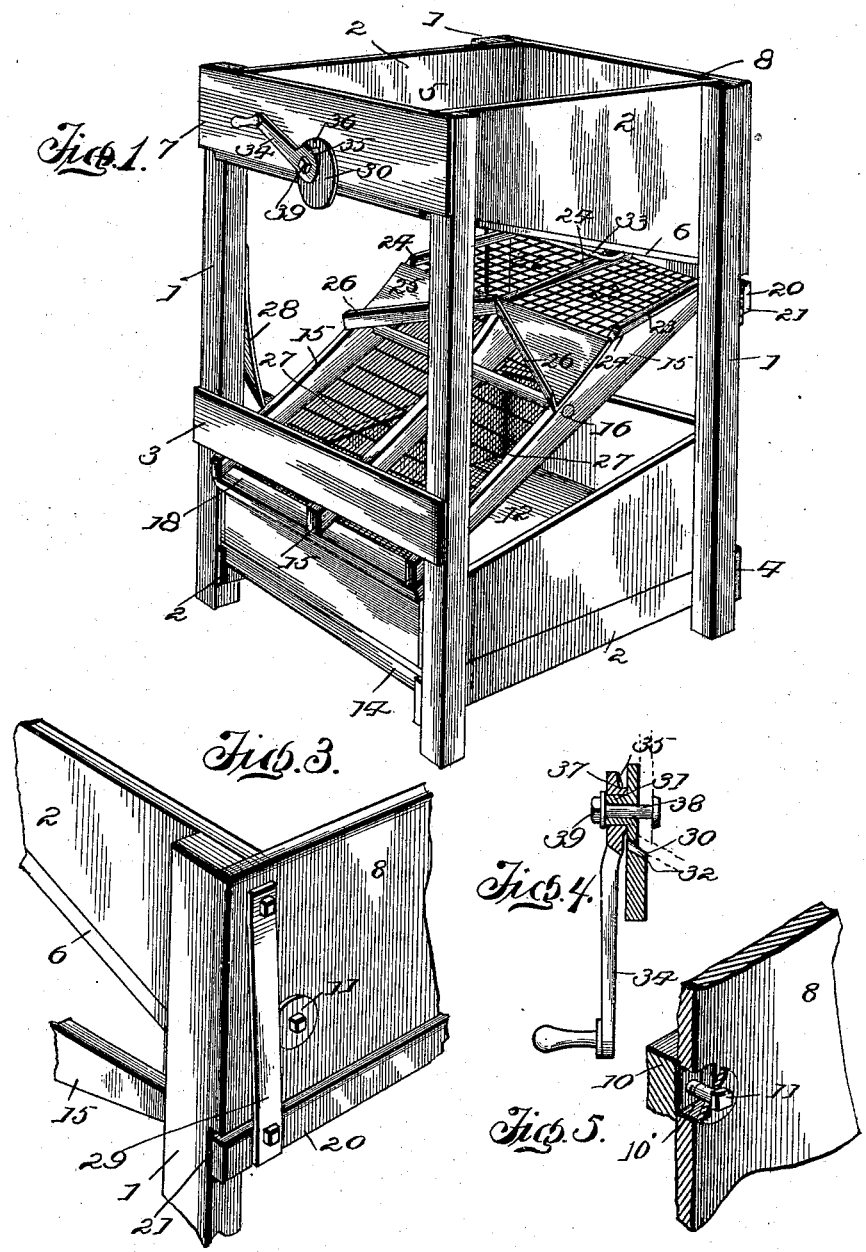
Witnesses
E. W. Hart
Sarah V. Lockwood
Inventor
William James Kerr
by Geo. A. Hamlin
His Attorney No. 692,145. Patented Jan. 28, 1902.
W. J. KERR.
GRAIN SEPARATOR.
(Application filed Oct. 6, 1900.)
(No Model.) 2 Sheets—Sheet 2.
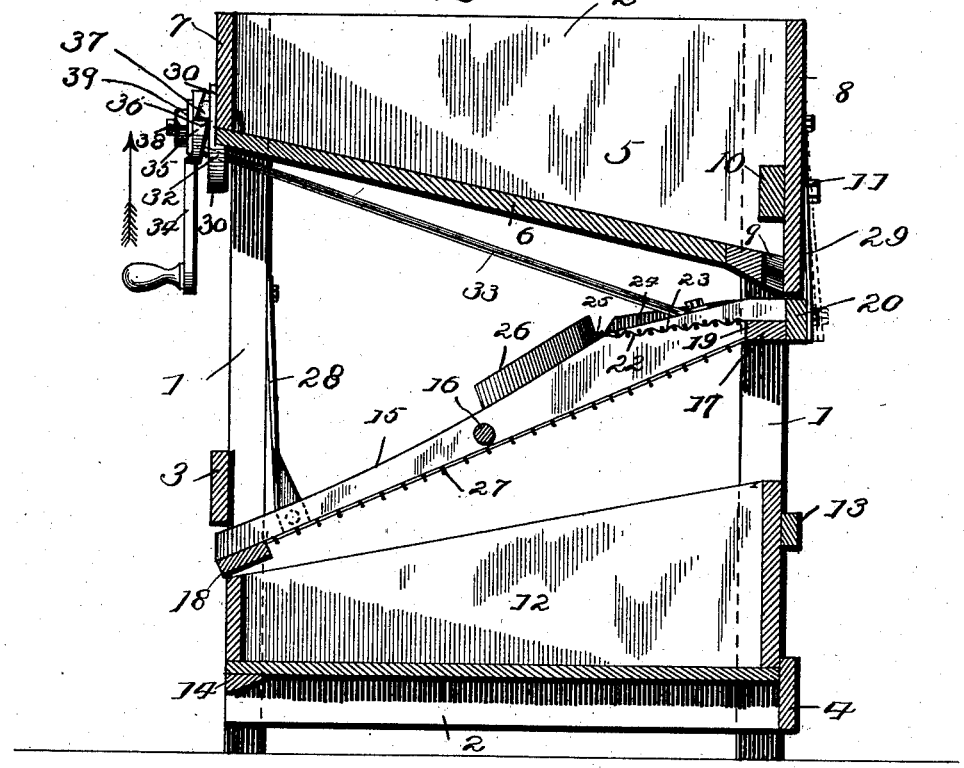
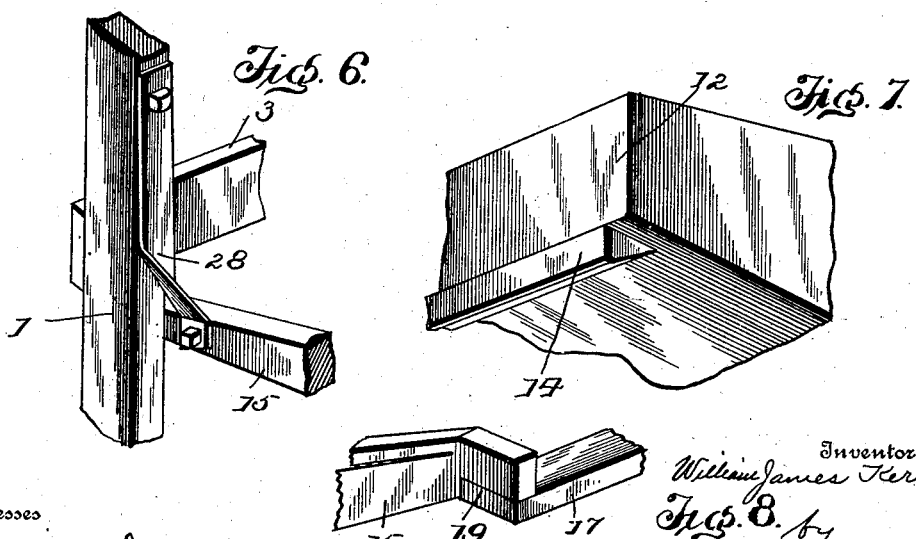
Witnesses
E. W. Hart
Sarah V. Lockwood.
Inventor
William James Kerr
by
Geo. R. Hawkins
His Attorney
THE NORRIS PETERS CO., PHOTO-LITHO., WASHINGTON, D. C.

UNITED STATES PATENT OFFICE.

WILLIAM JAMES KERR, OF OZARK, MISSOURI.

GRAIN-SEPARATOR.

SPECIFICATION forming part of Letters Patent No. 692,145, dated January 28, 1902.

Application filed October 6, 1900. Serial No. 32,251. (No model.)

*To all whom it may concern:*

Be it known that I, WILLIAM JAMES KERR, a citizen of the United States, residing at Ozark, county of Christian, and State of Missouri, have invented certain new and useful Improvements in Grain-Separators, of which the following is a specification.

My invention relates to grain-separators employing shaking-screens.

The object of the present invention is the provision of a grain-separator which will be of simple and durable construction and adapted to perform its functions in a highly-satisfactory manner, removing all the impurities and foreign matter from the grain without the employment of fanning devices of any character.

Stated more specifically, one of the objects of the invention is to provide an improved frame construction, with a hopper and novel manner of holding the drawer or receptacle which receives the cheat, cockle, mustard, and other seed separated from the grain.

Another object is to provide an improved arrangement of screens and conveyers of novel construction and also to provide a shaking or vibrating mechanism and allied parts of cheap, simple, and improved construction.

Having the foregoing objects in view and others not specifically mentioned, the invention consists in certain improved features of construction and novel arrangements and adaptations of parts, set forth in detail hereinafter and recited in the appended claim.

In the accompanying drawings, Figure 1 is a perspective of the machine; Fig. 2, a vertical section; Fig. 3, a detail view of the rear end of the hopper, showing one of the springs, the jarring-piece, &c.; Fig. 4, a sectional detail of the operating mechanism; Fig. 5, a detail view, broken away, showing the manner of adjusting the gate; Fig. 6, a detail of one of the springs and surrounding parts; Fig. 7, a detail of the lower end of the drawer; and Fig. 8, a detail of the joint at one corner of the screen-frame, at its upper end.

The frame has the uprights 1, connected by the braces 2, a lower front frame-piece 3, and a lower rear frame-piece 4. The hopper 5, which has the inclined bottom 6, has its side pieces connected to the inner faces of the upright and its ends 7 and 8 connected to the outer faces of the upright. This provides an extremely strong framework and at the same time gives a hopper of suitable size and disposition. The hopper has at its lower end a discharge-slot 9 and is provided on its inside with a gate 10 for regulating the feed of the grain, said gate having screws 11, working in vertical slots 10' in the end 8 and provided with washers whereby on loosening the screws the gate can be adjusted vertically and afterward secured by turning the screws.

The numeral 12 designates a drawer for receiving the cheat, cockle, mustard, and other seeds falling from the screen, said drawer being of such size as to rest on the braces 2 and to drop in back of the rear frame-piece 4, which latter has its upper edge raised above the braces 2. A stop-piece 13 on the end of the drawer and adapted for use as a handle in manipulating the latter has projecting ends adapted to bear against the uprights to prevent the drawer from sliding on the braces 2, while a stop-piece 14 on the drawer-bottom, at the front end thereof, fits in between the braces 2 and prevents lateral movement of the drawer or displacement thereof. In inserting the drawer it is simply pushed forward and allowed to drop inside of the rear frame-piece 4 and will thereupon be held against movement, but can be easily lifted at its rear end and pulled out.

The frame of the screens is provided with the side and center pieces 15, connected by the cross-brace 16 and the top and bottom pieces 17 and 18. The upper ends of the pieces 15 are notched on their under sides at 19 to take over the cross-piece 17, so that the latter is in horizontal position, and to this cross-piece 17 and the ends of the pieces 15 is secured a jarring piece or bar 20, which rises above the cross-piece 17 and has its ends adapted to abut on cushioning devices 21 on the uprights 1 at the rear of the machine. This construction allows the grain to pass off onto the screen and not to fall backward off the machine as it gravitates from the feed-opening in the hopper, while the striking of the ends of the jarring-piece on the cushions gives the screens an abrupt action necessary to the proper feed of the grain and other material. A coarse screen 22 is secured to the inclined top edges of the pieces 15 at the upper end of the screen-frame, the said pieces 15 being given the proper angle at 23, and the screen 22 is held to the pieces 15 by the strips 24. This screen reaches up to the piece 17, so that the grain is received directly thereon, and at the foot of the coarse screen 22 is a double conveyer 25, made of duplicate metal plates secured on top the pieces 15 and provided with the bent-up flanges 26, which converge upwardly and toward the upper end of the screen-frame. To the bottom of the screen-frame is secured the fine screen 27, whose lower end laps on top the piece 18, so that no obstruction will be offered to the free discharge of the grain. The screens are hung by spring-metal straps 28 at their front ends, said spring-straps being secured at their lower ends to the pieces 15 and fastened at their upper ends to the uprights 1. The upper end of the screen-frame is hung by spring-straps 29, which are connected at their lower ends to the jarring-piece and at their upper ends to the rear end piece of the hopper. The tendency of these springs is to urge the screen-frame downwardly and forwardly, with the delivery end of the screen-frame working close under the front frame-piece 3, which prevents the grain from scattering as it passes off the fine screen into a suitable box or receptacle which may be placed there for that purpose.

Secured to the front of the hopper, on the outside thereof, is a plate 30, provided with a boss 31 and an aperture 32, through which passes the end of an agitating-rod 33, which reaches back to the upper end of the center piece 15 and is secured thereto.

The numeral 34 designates a suitable crank which is provided with cam-inclines 35, having abrupt shoulders 36 on the circular hub 37 at its end, said hub fitting over the boss 31 and being held thereon by a bolt 38, passing through the boss and the plate 30 and end of the hopper, and a nut and washer 39. The end of the jarring-rod bears against the cam-inclines, and as the crank is turned it rides up an incline and then abruptly leaves it at the shoulder to repeat the operation on the succeeding incline, the springs which hang the screens keeping the end of the rod urged against the cam. In consequence of this action the screen-frame is pressed back and then suddenly released, whereupon the springs cause it to jump forwardly, only to be arrested by the engagement of the jarring-bar with the cushions on the upright.

The operation of the machine is as follows: The grain and foreign materials to be separated therefrom gravitate down the inclined bottom of the hopper and drop upon the upper end of the screen-frame. The coarse screen is of suitable mesh to separate the trash, sticks, and lumps, which feed forward and discharge at the sides of the machine after passing down the conveyers or chutes, and it will be observed that the inclination of the upper screen is very much less than that of the lower screen, which prevents the coarse materials and trash from feeding forward too rapidly. The grain and cheat, cockle, mustard, and other seeds pass through onto the fine screen, and they, with the exception of the grain, ultimately drop through the fine screen and into the drawer below, while the grain itself discharges off the lower end of the fine screen into a suitable receptacle placed there to receive it.

Having thus described my invention, what I claim as new, and desire to secure by Letters Patent, is—

In a grain-separator, the combination with a frame composed of upright members, braces therefor, and a cross frame-piece, of a hopper supported by the upright members, a vibrating screen comprising a frame composed of longitudinally-extending pieces having cross connecting-pieces, a fine screen connected to the bottom of the screen-frame, a coarser screen at the upper end of the frame and above the fine screen and located at an angle considerably less and more approximating the horizontal than the angle of disposition of the fine screen, and a pair of conveyers or chutes connected to the longitudinal pieces of the screen-frame and located adjacent the lower end of the coarse screen to receive the coarse material therefrom, said conveyers or chutes slanting downwardly at an angle to the upper screen and provided with upright retaining-flanges which converge upwardly and meet each other at the center of the screen-frame, said vibrating screen having its delivery end adapted to work under and closely adjacent to the cross frame-piece to confine the discharge of the grain, spring straps or hangers secured to the machine-frame and to the screen-frame and suspending the latter below the hopper and normally urging the screen in one direction, means for urging the screen in the opposite direction consisting of a rod connected to the screen, a rotary cam having an abrupt shoulder and against which the end of the rod is constantly held by the action of the spring-hangers, and a projecting member carried by the screen which forcibly contacts with the machine-frame to suddenly arrest the movement of the screen after release of the latter and at the end of its movement.

In testimony whereof I hereunto affix my signature in presence of two witnesses.

WILLIAM JAMES KERR.

Witnesses:
JOHN C. ROGERS,
JNO. S. TAYLOR.